United States Patent
Ih et al.

(10) Patent No.: US 9,213,455 B2
(45) Date of Patent: Dec. 15, 2015

(54) STYLUS WITH RESONANT CIRCUIT

(71) Applicants: Ronald Ih, Los Altos, CA (US); James D. Lyle, Santa Clara, CA (US)

(72) Inventors: Ronald Ih, Los Altos, CA (US); James D. Lyle, Santa Clara, CA (US)

(73) Assignee: Atmel Corporation, San Jose, CA (US)

( * ) Notice: Subject to any disclaimer, the term of this patent is extended or adjusted under 35 U.S.C. 154(b) by 52 days.

(21) Appl. No.: 13/653,818

(22) Filed: Oct. 17, 2012

(65) Prior Publication Data

US 2014/0104224 A1   Apr. 17, 2014

(51) Int. Cl.
*G06F 3/033* (2013.01)
*G06F 3/044* (2006.01)
*H04B 5/00* (2006.01)
*G06F 3/0354* (2013.01)

(52) U.S. Cl.
CPC ............ *G06F 3/044* (2013.01); *G06F 3/03545* (2013.01); *H04B 5/0012* (2013.01); *H04B 5/0031* (2013.01)

(58) Field of Classification Search
CPC ..... G06F 3/044; G06F 3/03545; G06F 3/046; G06F 3/041; G06F 3/147; G06F 3/1423; G06F 2203/04111; H03K 17/955
USPC .................. 345/179; 178/19.01, 19.03, 19.06, 178/19.07
See application file for complete search history.

(56) References Cited

U.S. PATENT DOCUMENTS

| | | | |
|---|---|---|---|
| 4,902,858 A * | 2/1990 | Yamanami et al. | 178/18.07 |
| 6,281,888 B1 * | 8/2001 | Hoffman et al. | 345/179 |
| 7,663,607 B2 | 2/2010 | Hotelling | |
| 7,875,814 B2 | 1/2011 | Chen | |
| 7,920,129 B2 | 4/2011 | Hotelling | |
| 8,031,094 B2 | 10/2011 | Hotelling | |
| 8,031,174 B2 | 10/2011 | Hamblin | |
| 8,040,326 B2 | 10/2011 | Hotelling | |
| 8,049,732 B2 | 11/2011 | Hotelling | |
| 8,179,381 B2 | 5/2012 | Frey | |
| 2003/0197691 A1 * | 10/2003 | Fujiwara et al. | 345/179 |
| 2005/0024347 A1 * | 2/2005 | Choi | 345/179 |
| 2008/0023232 A1 * | 1/2008 | Morag et al. | 178/19.01 |
| 2008/0150918 A1 * | 6/2008 | Hagen et al. | 345/179 |
| 2008/0238885 A1 * | 10/2008 | Zachut et al. | 345/174 |
| 2009/0315854 A1 | 12/2009 | Matsuo | |
| 2010/0053113 A1 * | 3/2010 | Wu et al. | 345/174 |
| 2010/0079402 A1 * | 4/2010 | Grunthaner et al. | 345/174 |
| 2010/0170726 A1 * | 7/2010 | Yeh et al. | 178/19.03 |
| 2010/0302201 A1 * | 12/2010 | Ritter et al. | 345/174 |

(Continued)

FOREIGN PATENT DOCUMENTS

WO    WO 2012/129247    9/2012

OTHER PUBLICATIONS

Yount and Freeman, "University Physics," 2008, Pearson Education, 12 edition, vol. 2, p. 1093.*

(Continued)

*Primary Examiner* — Sanjiv D Patel
(74) *Attorney, Agent, or Firm* — Baker Botts L.L.P.

(57) ABSTRACT

In one embodiment, at least one resonant circuit in a stylus receives a first signal from a touch sensor of a device. The first signal is received at the resonant circuit by capacitive coupling between the resonant circuit and a conductive element of the device's touch sensor. A second signal based on the first signal and at least one of the at least one resonant circuit is then transmitted from the stylus to the device by capacitive coupling between the stylus and the touch sensor of the device.

20 Claims, 4 Drawing Sheets

(56) References Cited

U.S. PATENT DOCUMENTS

| | | |
|---|---|---|
| 2010/0321338 A1* | 12/2010 | Ely ............................. 345/174 |
| 2012/0242588 A1 | 9/2012 | Myers |
| 2012/0242592 A1 | 9/2012 | Rothkopf |
| 2012/0243151 A1 | 9/2012 | Lynch |
| 2012/0243719 A1 | 9/2012 | Franklin |

OTHER PUBLICATIONS

U.S. Appl. No. 61/454,936, filed Mar. 21, 2011, Myers.
U.S. Appl. No. 61/454,950, filed Mar. 21, 2011, Lynch.
U.S. Appl. No. 61/454,894, filed Mar. 21, 2011, Rothkopf.

* cited by examiner

STYLUS WITH RESONANT CIRCUIT

TECHNICAL FIELD

This disclosure generally relates to touch-sensitive technology.

BACKGROUND

A touch sensor may detect the presence and location of a touch or the proximity of an object (such as a user's finger or a stylus) within a touch-sensitive area of the touch sensor overlaid on a display screen, for example. In a touch-sensitive-display application, the touch sensor may enable a user to interact directly with what is displayed on the screen, rather than indirectly with a mouse or touch pad. A touch sensor may be attached to or provided as part of a desktop computer, laptop computer, tablet computer, personal digital assistant (PDA), smartphone, satellite navigation device, portable media player, portable game console, kiosk computer, point-of-sale device, or other suitable device. A control panel on a household or other appliance may include a touch sensor.

There are a number of different types of touch sensors, such as, for example, resistive touch screens, surface acoustic wave touch screens, and capacitive touch screens. Herein, reference to a touch sensor may encompass a touch screen, and vice versa, where appropriate. When an object touches or comes within proximity of the surface of the capacitive touch screen, a change in capacitance may occur within the touch screen at the location of the touch or proximity. A touch-sensor controller may process the change in capacitance to determine its position on the touch screen.

DESCRIPTION OF EXAMPLE EMBODIMENTS

Figure 1:
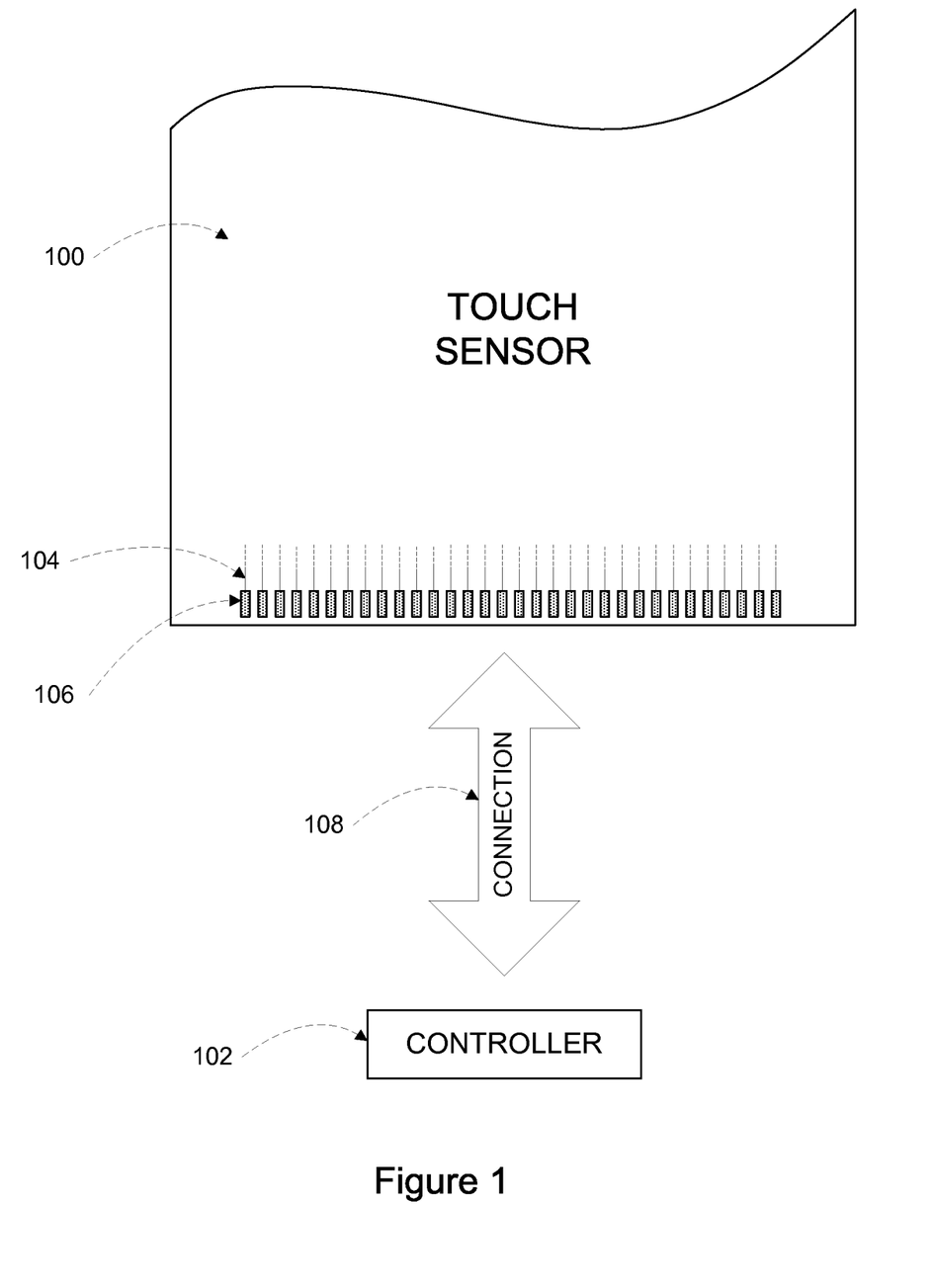
FIG. 1 illustrates an example touch sensor with an example touch-sensor controller.

FIG. 1 illustrates an example touch sensor 100 with an example touch-sensor controller 102. Touch sensor 100 and touch-sensor controller 102 may detect the presence and location of a touch or the proximity of an object within a touch-sensitive area of touch sensor 100. Herein, reference to a touch sensor may encompass both the touch sensor and its touch-sensor controller, where appropriate. Similarly, reference to a touch-sensor controller may encompass both the touch-sensor controller and its touch sensor, where appropriate. Touch sensor 100 may include one or more touch-sensitive areas, where appropriate. Touch sensor 100 may include an array of drive and sense electrodes (or an array of electrodes of a single type) disposed on one or more substrates, which may be made of a dielectric material. Herein, reference to a touch sensor may encompass both the electrodes of the touch sensor and the substrate(s) that they are disposed on, where appropriate. Alternatively, where appropriate, reference to a touch sensor may encompass the electrodes of the touch sensor, but not the substrate(s) that they are disposed on.

An electrode (whether a ground electrode, guard electrode, drive electrode, or sense electrode) may be an area of conductive material forming a shape, such as for example a disc, square, rectangle, thin line, other suitable shape, or suitable combination of these. One or more cuts in one or more layers of conductive material may (at least in part) create the shape of an electrode, and the area of the shape may (at least in part) be bounded by those cuts. In particular embodiments, the conductive material of an electrode may occupy approximately 100% of the area of its shape. As an example, an electrode may be made of indium tin oxide (ITO) and the ITO of the electrode may occupy approximately 100% of the area of its shape (sometimes referred to as a 100% fill), where appropriate. In particular embodiments, the conductive material of an electrode may occupy substantially less than 100% of the area of its shape. As an example, an electrode may be made of fine lines of metal or other conductive material (FLM), such as for example copper, silver, or a copper- or silver-based material, and the fine lines of conductive material may occupy approximately 5% or less of the area of its shape in a hatched, mesh, or other suitable pattern. Herein, reference to FLM encompasses such material, where appropriate. Although this disclosure describes or illustrates particular electrodes made of particular conductive material forming particular shapes with particular fill percentages having particular patterns, this disclosure contemplates any suitable electrodes made of any suitable conductive material forming any suitable shapes with any suitable fill percentages having any suitable patterns.

Where appropriate, the shapes of the electrodes (or other elements) of a touch sensor may constitute in whole or in part one or more macro-features of the touch sensor. One or more characteristics of the implementation of those shapes (such as, for example, the conductive materials, fills, or patterns within the shapes) may constitute in whole or in part one or more micro-features of the touch sensor. One or more macro-features of a touch sensor may determine one or more characteristics of its functionality, and one or more micro-features of the touch sensor may determine one or more optical features of the touch sensor, such as transmittance, refraction, or reflection.

A mechanical stack may contain the substrate (or multiple substrates) and the conductive material forming the drive or sense electrodes of touch sensor 100. As an example, the mechanical stack may include a first layer of optically clear adhesive (OCA) beneath a cover panel. The cover panel may be clear and made of a resilient material suitable for repeated touching, such as for example glass, polycarbonate, or poly (methyl methacrylate) (PMMA). This disclosure contemplates any suitable cover panel made of any suitable material. The first layer of OCA may be disposed between the cover panel and the substrate with the conductive material forming the drive or sense electrodes. The mechanical stack may also include a second layer of OCA and a dielectric layer (which may be made of PET or another suitable material, similar to the substrate with the conductive material forming the drive or sense electrodes). As an alternative, where appropriate, a thin coating of a dielectric material may be applied instead of the second layer of OCA and the dielectric layer. The second layer of OCA may be disposed between the substrate with the conductive material making up the drive or sense electrodes and the dielectric layer, and the dielectric layer may be disposed between the second layer of OCA and an air gap to a display of a device including touch sensor 100 and touch-sensor controller 102. As an example, the cover panel may have a thickness of approximately 1 mm; the first layer of OCA may have a thickness of approximately 0.05 mm; the substrate with the conductive material forming the drive or sense electrodes may have a thickness of approximately 0.05 mm; the second layer of OCA may have a thickness of approximately 0.05 mm; and the dielectric layer may have a thickness of approximately 0.05 mm. Although this disclosure describes a particular mechanical stack with a particular number of particular layers made of particular materials and having particular thicknesses, this disclosure contemplates any suitable mechanical stack with any suitable number of any suitable layers made of any suitable materials and having any suitable thicknesses. As an example, in particular embodiments, a layer of adhesive or dielectric may replace the dielectric layer, second layer of OCA, and air gap described above, with there being no air gap to the display.

One or more portions of the substrate of touch sensor 100 may be made of polyethylene terephthalate (PET) or another suitable material. This disclosure contemplates any suitable substrate with any suitable portions made of any suitable material. In particular embodiments, the drive or sense electrodes in touch sensor 100 may be made of ITO in whole or in part. In particular embodiments, the drive or sense electrodes in touch sensor 100 may be made of fine lines of metal or other conductive material. As an example, one or more portions of the conductive material may be copper or copper-based and have a thickness of approximately 5 μm or less and a width of approximately 10 μm or less. As another example, one or more portions of the conductive material may be silver or silver-based and similarly have a thickness of approximately 5 μm or less and a width of approximately 10 μm or less. This disclosure contemplates any suitable electrodes made of any suitable material.

Touch sensor 100 may implement a capacitive form of touch sensing. In a mutual-capacitance implementation, touch sensor 100 may include an array of drive and sense electrodes forming an array of capacitive nodes. A drive electrode and a sense electrode may form a capacitive node. The drive and sense electrodes forming the capacitive node may come near each other, but not make electrical contact with each other. Instead, the drive and sense electrodes may be capacitively coupled to each other across a space between them. A pulsed or alternating voltage applied to the drive electrode (by touch-sensor controller 102) may induce a charge on the sense electrode, and the amount of charge induced may be susceptible to external influence (such as a touch or the proximity of an object). When an object touches or comes within proximity of the capacitive node, a change in capacitance may occur at the capacitive node and touch-sensor controller 102 may measure the change in capacitance. By measuring changes in capacitance throughout the array, touch-sensor controller 102 may determine the position of the touch or proximity within the touch-sensitive area(s) of touch sensor 100.

In a self-capacitance implementation, touch sensor 100 may include an array of electrodes of a single type that may each form a capacitive node. When an object touches or comes within proximity of the capacitive node, a change in self-capacitance may occur at the capacitive node and controller 102 may measure the change in capacitance, for example, as a change in the amount of charge needed to raise the voltage at the capacitive node by a predetermined amount. As with a mutual-capacitance implementation, by measuring changes in capacitance throughout the array, controller 102 may determine the position of the touch or proximity within the touch-sensitive area(s) of touch sensor 100. This disclosure contemplates any suitable form of capacitive touch sensing, where appropriate.

In particular embodiments, one or more drive electrodes may together form a drive line running horizontally or vertically or in any suitable orientation. Similarly, one or more sense electrodes may together form a sense line running horizontally or vertically or in any suitable orientation. In particular embodiments, drive lines may run substantially perpendicular to sense lines. Herein, reference to a drive line may encompass one or more drive electrodes making up the drive line, and vice versa, where appropriate. Similarly, reference to a sense line may encompass one or more sense electrodes making up the sense line, and vice versa, where appropriate.

Touch sensor 100 may have drive and sense electrodes disposed in a pattern on one side of a single substrate. In such a configuration, a pair of drive and sense electrodes capacitively coupled to each other across a space between them may form a capacitive node. For a self-capacitance implementation, electrodes of only a single type may be disposed in a pattern on a single substrate. In addition or as an alternative to having drive and sense electrodes disposed in a pattern on one side of a single substrate, touch sensor 100 may have drive electrodes disposed in a pattern on one side of a substrate and sense electrodes disposed in a pattern on another side of the substrate. Moreover, touch sensor 100 may have drive electrodes disposed in a pattern on one side of one substrate and sense electrodes disposed in a pattern on one side of another substrate. In such configurations, an intersection of a drive electrode and a sense electrode may form a capacitive node. Such an intersection may be a location where the drive electrode and the sense electrode "cross" or come nearest each other in their respective planes. The drive and sense electrodes do not make electrical contact with each other—instead they are capacitively coupled to each other across a dielectric at the intersection. Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

As described above, a change in capacitance at a capacitive node of touch sensor 100 may indicate a touch or proximity input at the position of the capacitive node. Touch-sensor controller 102 may detect and process the change in capacitance to determine the presence and location of the touch or proximity input. Touch-sensor controller 102 may detect a change in capacitance by detecting a change in voltage of the capacitive node, in particular embodiments. Touch-sensor controller 102 may detect a change in capacitance by holding the voltage of a touch-sensitive node constant and measuring one or more electrical currents resulting from the change in capacitance of the node, in particular embodiments. While this disclosure provides specific examples of ways a touch-sensor controller may detect a change in capacitance of a capacitive node, this disclosure contemplates any suitable method used by a touch-sensor controller to detect a change in capacitance of a capacitive node.

After detecting a change in capacitance, touch-sensor controller 102 may then communicate information about the touch or proximity input to one or more other components (such one or more central processing units (CPUs)) of a device that includes touch sensor 100 and touch-sensor controller 102, which may respond to the touch or proximity input by initiating a function of the device (or an application running on the device). Although this disclosure describes a particular touch-sensor controller having particular functionality with respect to a particular device and a particular touch sensor, this disclosure contemplates any suitable touch-sensor controller having any suitable functionality with respect to any suitable device and any suitable touch sensor.

Touch-sensor controller 102 may be one or more integrated circuits (ICs), such as for example general-purpose microprocessors, microcontrollers, programmable logic devices (PLDs) or programmable logic arrays (PLAs), application-specific ICs (ASICs). In particular embodiments, touch-sensor controller 102 comprises analog circuitry, digital logic, and digital non-volatile memory. In particular embodiments, touch-sensor controller 102 is disposed on a flexible printed circuit (FPC) bonded to the substrate of touch sensor 100, as described below. The FPC may be active or passive, where appropriate. In particular embodiments multiple touch-sensor controllers 102 are disposed on the FPC. Touch-sensor controller 102 may include a processor unit, a drive unit, a sense unit, and a storage unit. The drive unit may supply drive signals to the drive electrodes of touch sensor 100. Drive signals may take any suitable waveform or be of any suitable frequency, number, or duration, in particular embodiments. Drive signals may be periodic signals driven at a frequency of at least about 100 kilohertz, in particular embodiments. The sense unit may sense charge, voltage, current, or another other suitable electrical signal at the capacitive nodes of touch sensor 100 and provide measurement signals to the processor unit representing capacitances at the capacitive nodes. Processing may be performed on the sensed signals to determine any suitable characteristic of the signals, such as spectral frequencies of the signals, signal amplitude, etc, in particular embodiments. The processor unit may control the supply of drive signals to the drive electrodes by the drive unit and process measurement signals from the sense unit to detect and process the presence and location of a touch or proximity input within the touch-sensitive area(s) of touch sensor 100. The processor unit may also track changes in the position of a touch or proximity input within the touch-sensitive area(s) of touch sensor 100. The storage unit may store programming for execution by the processor unit, including programming for controlling the drive unit to supply drive signals to the drive electrodes, programming for processing measurement signals from the sense unit, and other suitable programming, where appropriate. Although this disclosure describes a particular touch-sensor controller having a particular implementation with particular components, this disclosure contemplates any suitable touch-sensor controller having any suitable implementation with any suitable components.

Tracks 104 of conductive material disposed on the substrate of touch sensor 100 may couple the drive or sense electrodes of touch sensor 100 to connection pads 106, also disposed on the substrate of touch sensor 100. As described below, connection pads 106 facilitate coupling of tracks 104 to touch-sensor controller 102. Tracks 104 may extend into or around (e.g. at the edges of) the touch-sensitive area(s) of touch sensor 100. Particular tracks 104 may provide drive connections for coupling touch-sensor controller 102 to drive electrodes of touch sensor 100, through which the drive unit of touch-sensor controller 102 may supply drive signals to the drive electrodes. Other tracks 104 may provide sense connections for coupling touch-sensor controller 102 to sense electrodes of touch sensor 100, through which the sense unit of touch-sensor controller 102 may sense charge at the capacitive nodes of touch sensor 100. Tracks 104 may be made of fine lines of metal or other conductive material. As an example, the conductive material of tracks 104 may be copper or copper-based and have a width of approximately 100 μm or less. As another example, the conductive material of tracks 104 may be silver or silver-based and have a width of approximately 100 μm or less. In particular embodiments, tracks 104 may be made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 104, touch sensor 100 may include one or more ground lines terminating at a ground connector (which may be a connection pad 106) at an edge of the substrate of touch sensor 100 (similar to tracks 104).

Connection pads 106 may be located along one or more edges of the substrate, outside the touch-sensitive area(s) of touch sensor 100. As described above, touch-sensor controller 102 may be on an FPC. Connection pads 106 may be made of the same material as tracks 104 and may be bonded to the FPC using an anisotropic conductive film (ACF). Connection 108 may include conductive lines on the FPC coupling touch-sensor controller 102 to connection pads 106, in turn coupling touch-sensor controller 102 to tracks 104 and to the drive or sense electrodes of touch sensor 100. In another embodiment, connection pads 106 may be connected to an electro-mechanical connector (such as a zero insertion force wire-to-board connector); in this embodiment, connection 108 may not need to include an FPC. This disclosure contemplates any suitable connection 108 between touch-sensor controller 102 and touch sensor 100.

Figure 2:
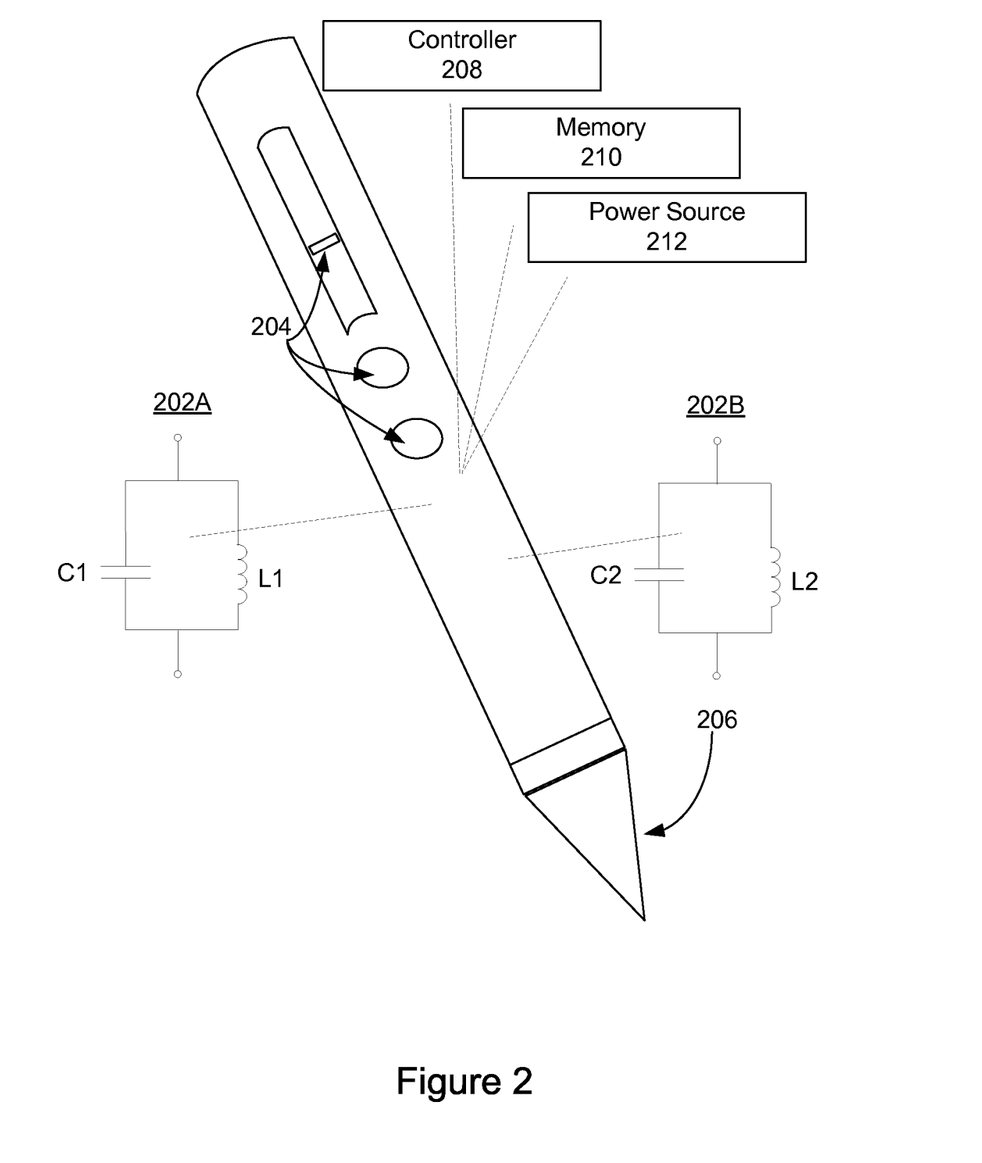
FIG. 2 illustrates an example stylus that may be used with the touch sensor of FIG. 1.

FIG. 2 illustrates an example stylus 200. Stylus 200 may have any suitable dimensions with an outer body made of any suitable material or combination of materials, such as, for example and without limitation, plastic or metal. Stylus 200 may include one or more tips 206 that have any suitable dimensions, such a diameter of about 2 mm or less at its terminal end. Tips 206 may be made of any suitable material, such as metal. Stylus 200 may include one or more resonant circuits. Stylus 200 may include any suitable number or type of resonant circuits, such as a crystal oscillator, a sawtooth filter, an LC circuit, and RLC circuit, or any other suitable kind or type. Stylus 200 may include more than one type of resonant, in particular embodiments. While example resonant circuit 202 illustrates an LC resonant circuit, this disclosure contemplates any suitable resonant circuit as providing the functionality of resonant circuit 202 described herein. A resonant circuit 202 may include any other suitable electrical component, such as one or more resistors or operational amplifiers. Other resonant circuits may have other electrical components, such as piezoelectric crystals or saw-tooth filters as described above. One or more electrical components in any one resonant circuit may have different or the same properties than corresponding electrical components in any other resonant circuit, in particular embodiments. For example, for two or more LC resonant circuits, the capacitance of capacitor C1 of resonant circuit 202A may be different than the capacitance of capacitor C2 of resonant circuit 202B. Q factors, which depend on the properties of a resonant circuit's electrical components, are often used to describe the frequency response of a resonant circuit to an input. A resonant circuit 202 may have a different Q factor than another resonant circuit 202, in particular embodiments. The properties of any electrical component in any of resonant circuits 202 may be variable, in particular embodiments. As a result, the Q factor of any resonant circuit 202 may also be variable. For example, in LC resonant circuits the capacitance of capacitor C1, C2, or both may be varied by mechanical control, electronic control, or digital tuning. Likewise, the inductance of inductor L1 or the resistance of a resistor in a resonant circuit 202 may also be varied. As another example, mechanical control, electrical control, or digital tuning may be used to select among different crystal oscillators or saw-tooth filters in a resonant circuit, thus affecting a change in the response of the resonant circuit. As another example, a resonant circuit containing a crystal oscillator may be tuned by altering the circuit capacitance or by deforming a crystal in the circuit, for example by applying mechanical pressure to the crystal. Stylus 200 may include one or more interactive elements 204 on its surface through which a user of stylus 200 may adjust the properties of one or more electronic components of a resonant circuit 202. Interactive elements 204 may be buttons, sliders, knobs, or any other suitable component, and the status of such elements correspond to a particular Q factor or particular characteristic of an electronic component. While this disclosure describes specific methods of altering specific properties of specific electronic components in a specific type of resonant circuit in a stylus, this disclosure contemplates that any suitable method for varying any suitable property of any suitable electronic components of any suitable resonant circuit.

Stylus 200 may include a controller 208, memory 210, or power source 212, in particular embodiments. Controller 208 may be a microcontroller or any other type of processor suitable for controlling the operation of stylus 200. Controller 208 may be one or more ICs—such as, for example, general-purpose microprocessors, microcontrollers, PLDs, PLAs, or ASICs. Controller 208 may include a processor unit, a drive unit, a sense unit, and a storage unit. The drive unit may supply signals to electrodes of tip 26 through center shaft 41. The drive unit may also supply signals to control or drive sensors or one or more external components of stylus 200. The sense unit may sense signals received by the stylus and provide measurement signals to the processor unit representing input from a device. The sense unit may also sense signals generated by sensors on or in the stylus or by or one or more external components and provide measurement signals to the processor unit representing input from a user. The processor unit may control the supply of signals to the electrodes of tip 26 and process measurement signals from the sense unit to detect and process input from the device. The storage unit may store programming for execution by the processor unit, including programming for controlling the drive unit to supply signals to the electrodes of tip 26, programming for processing measurement signals from the sense unit corresponding to input from the device, programming for processing measurement signals from sensors or external components to initiate a predetermined function or gesture to be performed by stylus 200 or the device, and other suitable programming, where appropriate. As an example, programming executed by controller 208 may electronically filter signals received from the sense unit. Memory 210 may implement software or embody logic for processing, sending, or receiving signals from other components of stylus 200, such as controller 208, in particular embodiments. Memory 210 may be any suitable type of volatile or non-volatile memory. Although this disclosure describes a particular controller 208 having a particular implementation with particular components, this disclosure contemplates any suitable controller having any suitable implementation with any suitable components.

Power source 212 may be any type of stored-energy source, including electrical or chemical-energy sources, suitable for powering the operation of stylus 200. Power source 212 may be charged by energy from a user or device, in particular embodiments. As an example, power source 212 may be a rechargeable battery that may be charged by motion induced on stylus 200. Power source 212 of stylus 200 may provide power to or receive power from the device. As an example, power may be inductively transferred between power source 212 and a power source of a device.

Regardless or whether stylus 200 is powered or passive, one or more resonant circuits 202 may communicate with a touch sensor of a device. One or more portions of the touch sensor may capacitively couple to at least one resonant circuit 202 to transmit signals from the touch sensor to at least one resonant circuit 202, transmit signals from at least one resonant circuit 202 to the touch sensor, or both. The response of resonant circuit 202 to signals received from a touch sensor will depend on characteristics of the received signal and the characteristics of one or more electrical components in resonant circuit 202. Because the response of resonant circuit 202 is unique to these parameters, the response may be used to implement one or more functionalities relating to stylus 200, a device, or both. Descriptions of the types of functionalities the response of resonant circuit 200 due to capacitive coupling between a touch sensor and resonant circuit 200 provides is described more fully herein.

Figure 3:
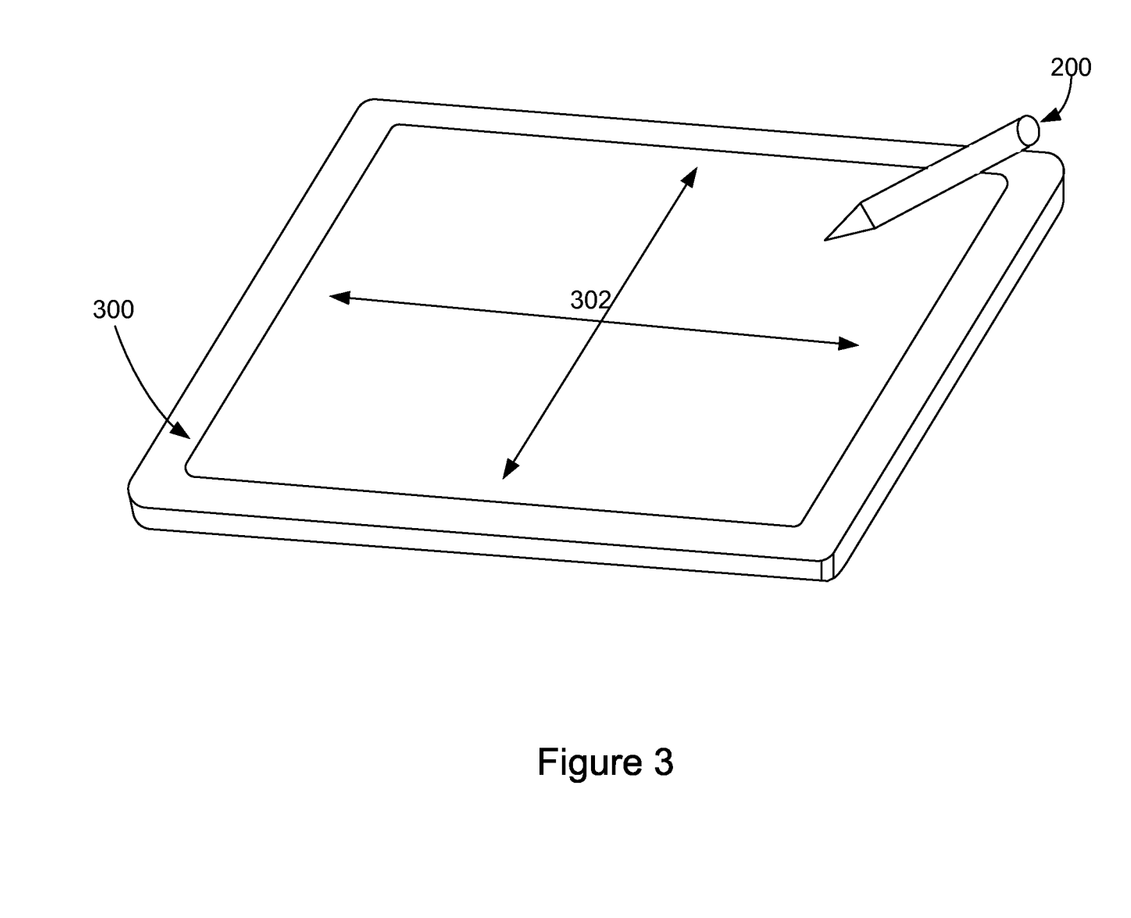
FIG. 3 illustrates the example stylus of FIG. 2 interacting with an example touch-sensitive device.

FIG. 3 illustrates an example stylus 200 with an example device 300. Device 300 may have a display and a touch sensor with a touch-sensitive area 302. Device 300 display may be a liquid crystal display (LCD), a LED display, a LED-backlight LCD, or other suitable display and may be visible though a cover panel and substrate (and the drive and sense electrodes of the touch sensor disposed on it) of device 300. Although this disclosure describes a particular device display and particular display types, this disclosure contemplates any suitable device display and any suitable display types.

Device 300 electronics may provide the functionality of device 300. As example, device 300 electronics may include circuitry or other electronics for wireless communication to or from device 300, execute programming on device 300, generating graphical or other user interfaces (UIs) for device 300 display to display to a user, managing power to device 300 from a battery or other power source, taking still pictures, recording video, other suitable functionality, or any suitable combination of these. Although this disclosure describes particular device electronics providing particular functionality of a particular device, this disclosure contemplates any suitable device electronics providing any suitable functionality of any suitable device.

Stylus 200 may interact or communicate with device 300 when stylus 200 is brought in contact with or in proximity to touch-sensitive area 302 of the touch sensor of device 300. Interaction between stylus 200 and device 300 may be capacitive or inductive. As an example, when stylus 200 is brought in contact with or in the proximity of touch-sensitive area 302 of device 300, a change in capacitance may occur in one or more capacitive nodes of the touch sensor of device 300 or vice versa. As another example, elements in the stylus and elements of the touch sensor of the device may capacitively couple to each other, providing for transmission of signals between the stylus and the touch sensor of the device. For example, one or more resonant circuits in the stylus may capacitively couple to one or more elements of the device's touch sensor, such as drive lines, sense lines, or both. As another example, a radio frequency identification chip in the stylus may capacitively couple to elements of the device's touch sensor.

Figure 4:
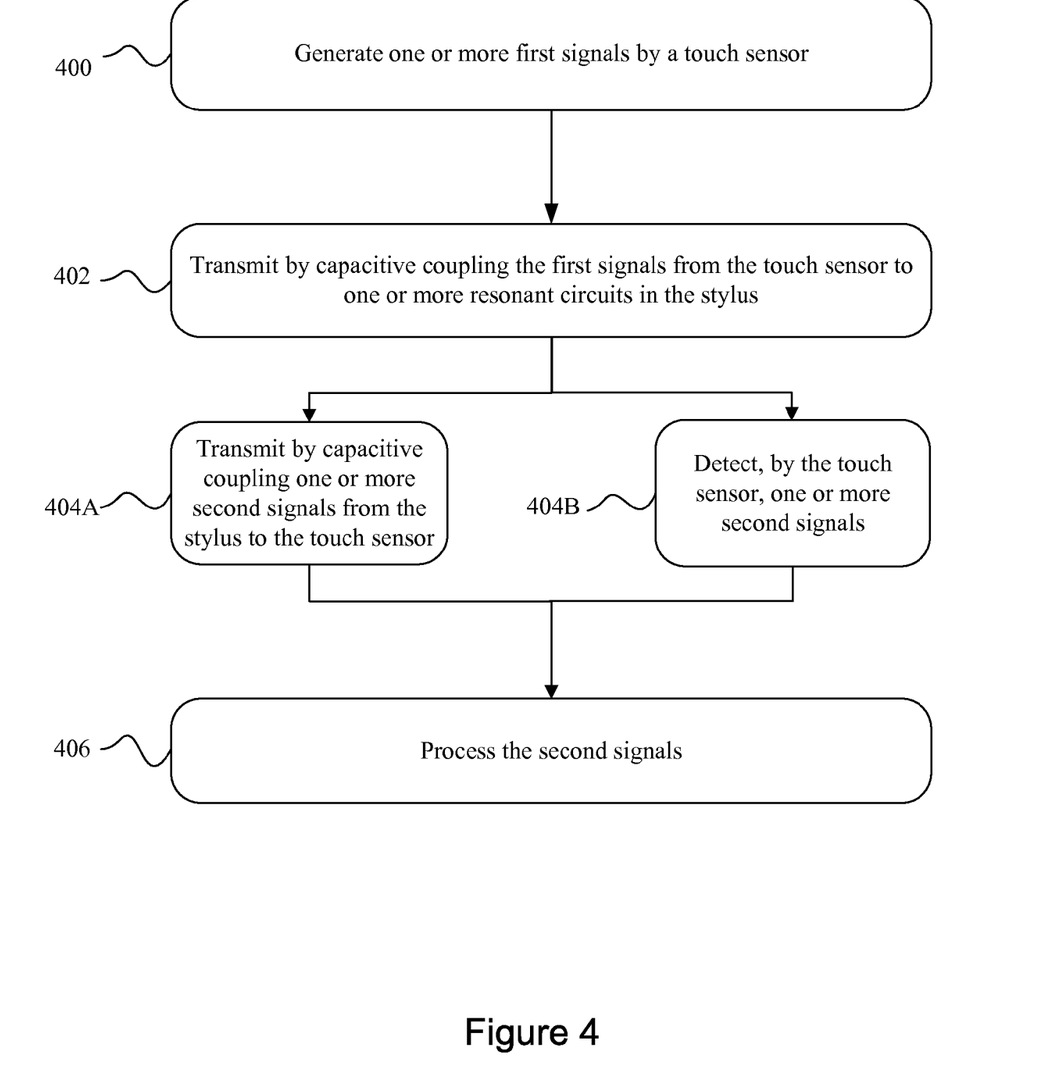
FIG. 4 illustrates an example method for transmitting signals between a stylus and a touch sensor of a device.

FIG. 4 illustrates an example method for transmitting signals between a stylus and the touch sensor of a device. The method may start at step 400, where one or more first signals are generated by a touch sensor of a device. For example, the touch sensor may periodically probe capacitive nodes of a device by transmitting one or more first signals to drive lines in the touch sensor. The first signals may be of any suitable number, take any suitable form, be of any suitable frequency, or last for any suitable duration.

At step 402, the touch sensor of the device transmits one or more first signals to one or more resonant circuits in the stylus by capacitive coupling between the touch sensor and the one or more resonant circuits. For each resonant circuit, the response generated by the resonant circuit to a first signal will depend on the characteristics of the first signal and of the resonant circuit. For example, the amplitude of the response in a resonant circuit may depend on the amplitude of the first signal, the frequency of the first signal, the duration of the first signal, the waveform of the first signal (such as, for example, a sine wave, square wave, sawtooth wave, or any other suitable waveform), or any other suitable attribute of the first signal. The response of the resonant circuit also depends on the attributes of the resonant circuit, such as the characteristics of individual electrical components in the resonant circuit or the Q factor of the resonant circuit. The response of a resonant circuit to a first signal may be processed by a stylus's controller, memory, or any other suitable logic in the stylus, in particular embodiments. As an example, signals generated by a resonant circuit in response to one or more first signals may be processed before they are sent to a radio frequency identification chip in the stylus. For example, processors or other suitable logic in the stylus may determine from one or more resonant circuits' response an appropriate radio frequency identification chip to send a signal to. As another example, signals generated by a resonant circuit in response to one or more first signals may be processed to implement some functionality of the stylus or determine some information about the stylus. This disclosure contemplates any suitable type of processing performed on signals generated by a response of one or more resonant circuits in a stylus to one or more first signals generated by a touch sensor of a device and transmitted to the one or more resonant circuits by capacitive coupling between the resonant circuits and the touch sensor of the device.

At step 404A the stylus capacitively couples to an element of the touch sensor and transmits from the stylus to the touch sensor one or more second signals. The second signals are based at least on one of the first signals received by the stylus and at least one of the resonant circuits. A resonant circuit receiving a first signal capacitively couples with the touch sensor to transmit a second signal to the device, in particular embodiments. For example, the second signal may be all or a portion of signals generated by the response of the resonant circuit to the first signals received by the resonant circuit. A radio frequency identification chip in the stylus capacitively couples with a touch sensor to transmit a second signal to a device, in particular embodiments. For example, the second signal may be a unique or identifying signal associated with memory contents or electronic configuration of the radio frequency identification chip. The element of the touch sensor capacitively coupling to the stylus and receiving the second signal may be different than the element of the touch sensor transmitting a first signal to the stylus, in particular embodiments. For example, a touch sensor may transmit a first signal to a resonant circuit by a drive line and then receive the second signal on one or more sense lines of the touch sensor. The touch sensor may transmit one or more first signals at predetermined first intervals and sense received one or more second signals at predetermined second intervals, in particular embodiments. An element of the touch sensor transmitting a first signal may be the same as an element receiving the second signal, in particular embodiments.

In addition or the alternative, at step 404B the touch sensor detects a change in the first signal resulting from transmission of the first signal from the touch sensor to the stylus by capacitive coupling of the touch sensor to one or more resonant circuits in the stylus. The interaction of the first signal with the one or more resonant circuits in the stylus results in a change in the first signal at the touch sensor due to the exchange of energy in the first signal with the resonant circuit. The change of the first signal depends on the characteristics of the first signal, such as its frequency or waveform, and the characteristics of the resonant circuit in the stylus. A relatively stronger resonant circuit response to the first signal results in a relatively greater change in the first signal. Changes in the first signal may be detected by any suitable method. For example, the touch sensor may detect a decrease in voltage of the first signal, a decrease in apparent impedance in a conductive element transmitting the first signal, an increase in the powered required to maintain the first signal at a constant voltage, or any other suitable method.

At step 406, the touch sensor or controller (which are used interchangeably below, as appropriate) associated with the touch sensor processes the received or detected signals (or both) to determine some functionality or information, at which point the method may end. The touch sensor may access memory to compare one or more characteristics of the received or detected signals to one or more corresponding characteristics stored in memory. Characteristics of a received or detected signal may identify a stylus, as the received signal will depend on the characteristics of any resonant circuit and/or radio frequency identification chip transmitting the signal, and the detected signal will depend on the characteristics of any resonant circuit receiving the first signal. A received or detected signal may identify or authenticate a user of a stylus or indicate some functionality that a user wishes the stylus or device to perform, in particular embodiments. For example, interactive elements or other tuning mechanisms may allow a user to vary the response (for example, by varying the Q factor) of a resonant circuit to a first signal, which may vary the signal received or detected by the touch sensor. The touch sensor may then process the signal to determine the settings corresponding to the configuration of one or more resonant circuits in the stylus. For example, a user may depress a button or adjust a slider or knob to change how the stylus provides output (for example by changing the typesetting) to a touch-sensitive display. As another example, depressing a button and contacting a display with the stylus may result in different functionality than simply contacting the display with the stylus, for example by simulating right-click and left-click actions performed with a mouse on a desktop computer.

A touch sensor may determine the orientation of a stylus based on the characteristics of received or detected signals, in particular embodiments. For example, a stylus may have a first resonant circuit in one end and a second resonant circuit in the opposite end. The response of the second circuit may be different than the response of the first second, allowing the touch sensor to determine which end of the stylus is in the proximity of the touch sensor. For example, a user may write on a touch-sensitive display with one end of the stylus and erase with the other. Likewise, the touch sensor may detect the angle of a stylus relative to the touch sensor or the distance of the stylus from the touch sensor by characteristics of one or more received or detected signals.

The touch sensor may differentiate between the presence of a stylus and another object by the characteristics of the one or more received or detected signals, in particular embodiments. For example, the touch sensor may differentiate between a stylus touch and contact by a user's finger or palm due to signal characteristics known by the touch sensor to be unique to the presence and configuration of a resonant circuit or radio frequency identification chip in the stylus. While this disclosure describes specific examples of the types of functionality implemented or information determined by a touch sensor processing a signal received by capacitive coupling with one or more resonant circuits or radio frequency identification chips or detecting a change in a first signal due to capacitive coupling between the touch sensor and the stylus, this disclosure contemplates any suitable functionality implemented or information determined by a touch sensor processing a signal received by capacitive coupling with one or more resonant circuits or radio frequency identification chips or detecting a change in a first signal resulting due to coupling between the touch sensor and the stylus.

Particular embodiments may repeat the steps of the method of FIG. 4, where appropriate. Moreover, although this disclosure describes and illustrates particular steps of the method of FIG. 4 as occurring in a particular order, this disclosure contemplates any suitable steps of the method of FIG. 4 occurring in any suitable order. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A stylus comprising:
a first resonant circuit disposed in or near a tip of the stylus, the first resonant circuit operable to receive, by capacitive coupling between a conductive element of a touch sensor and the first resonant circuit, a first signal from the touch sensor of a device; and
a second resonant circuit disposed in or near an end of the stylus opposite the tip, the second resonant circuit operable to receive, by capacitive coupling between the conductive element of the touch sensor and the second resonant circuit, a third signal from the touch sensor of a device; wherein the stylus is operable to:
transmit, by capacitive coupling between the stylus and the touch sensor of the device, a second signal from the stylus to the touch sensor of the device, the second signal based on the first signal and the first resonant circuit or;
transmit, by capacitive coupling between the stylus and the touch sensor of the device, a fourth signal from the stylus to the touch sensor of the device, the fourth signal based on the third signal and the second resonant circuit, wherein the second signal corresponds to a first user-configurable functionality of the device and the fourth signal corresponds to a second user-configurable functionality of the device that is different than the first user-configurable functionality.

2. The stylus of claim 1, further comprising at least one interactive element operable to alter an electrical property of the first or second resonant circuits.

3. The stylus of claim 2, wherein the electrical property comprises one or more of:
a capacitance of a capacitor in the first or second resonant circuit;
an inductance of an inductor in the first or second resonant circuit;
a resistance of a resistor in the first or second resonant circuit;
an electrical connection between a crystal oscillator and the first or second resonant circuit; and
an electrical connection between a saw-tooth filter and the first or second resonant circuit.

4. The stylus of claim 1, wherein one or both of:
the stylus is operable to transmit the second signal to the touch sensor by capacitive coupling between the first resonant circuit and the touch sensor; or
the stylus is operable to transmit the fourth signal to the touch sensor by capacitive coupling between the second resonant circuit and the touch sensor.

5. The stylus of claim 1, wherein the stylus is operable to transmit one or both of the second signal and the fourth signal to the touch sensor by capacitive coupling between a radio frequency element of the stylus and the touch sensor.

6. The stylus of claim 1, wherein the first resonant circuit has a different Q factor than the second resonant circuit.

7. The stylus of claim 1, wherein the first resonant circuit has a different resonant frequency than the second resonant circuit.

8. The stylus of claim 1, wherein one or both of the first signal and the third signal comprises a periodic signal with a frequency of at least 100 kilohertz.

9. A method comprising:
receiving, by at least one resonant circuit in a stylus, by capacitive coupling between a conductive element of a touch sensor and the resonant circuit, a signal from the touch sensor of a device; and transmitting, by capacitive coupling between the stylus and the touch sensor of the device, a second signal from the stylus to the device, wherein the stylus comprises:

a first resonant circuit disposed in or near a tip of the stylus, the first resonant circuit operable to receive, by capacitive coupling between a conductive element of a touch sensor and the first resonant circuit, the signal from the touch sensor of a device; and a second resonant circuit disposed in or near an end of the stylus opposite the tip, the second resonant circuit operable to receive, by capacitive coupling between a conductive element of the touch sensor and the second resonant circuit, the signal from the touch sensor of a device, wherein:

the second signal is based on the first signal and the first resonant circuit, the second signal corresponding to a first user-configurable functionality of the device; or the second signal is based on the first signal and the second resonant circuit, the second signal corresponding to a second user-configurable functionality of the device that is different than the first user-configurable functionality.

10. The method of claim 9, wherein the first resonant circuit has a different Q factor than the second resonant circuit.

11. An apparatus comprising:
a touch sensor comprising:
at least one first conductive element operable to transmit by capacitive coupling, between the at least one first conductive element and a first or second resonant circuit in a stylus, a first signal to the first or second resonant circuit, the first resonant circuit in or near a tip of the stylus and the second resonant circuit in or near an end of the stylus opposite the tip;
at least one second conductive element operable to detect a second signal based on the first signal and the first or second resonant circuit;
one or more non-transitory computer-readable storage media comprising instructions; and
one or more processors coupled to the media and operable to execute the instructions to:
process the received second signal to determine whether the tip of the stylus or the end of the stylus opposite the tip is near the touch sensor;
when the tip of the stylus is determined to be near the touch sensor, determine a first user-configurable functionality of the device; and
when the end of the stylus opposite the tip is determined to be near the touch sensor, determine a second user-configurable functionality of the device that is different than the first user-configurable functionality.

12. The apparatus of claim 11, wherein at least one of the at least one first conductive element is at least one of the at least one second conductive element.

13. The apparatus of claim 11, wherein the at least one second conductive element operable to detect a second signal further comprises the at least one second conductive element further operable to receive, by capacitive coupling between the second conductive element and the stylus, the second signal based on the first signal and the first or second resonant circuit.

14. The apparatus of claim 13, wherein the at least one second conductive element is further operable to receive, by capacitive coupling between the second conductive element and the first or second resonant circuit, the second signal based on the first signal and the first or second resonant circuit.

15. The apparatus of claim 13, wherein the at least one second conductive element is further operable to receive, by capacitive coupling between the second conductive element and at least one radio frequency identification element of the stylus, the second signal based on the first signal and the first or second resonant circuit.

16. The apparatus of claim 11, wherein the second signal comprises the first signal as modified by the capacitive coupling between the at least one first conductive element and the first or second resonant circuit.

17. The apparatus of claim 11, wherein the stylus further comprises at least one interactive element operable to alter an electrical property of the first or second resonant circuit.

18. The apparatus of claim 17, wherein the electrical property comprises one or more of:
a capacitance of a capacitor in the first or second resonant circuit;
an inductance of an inductor in the first or second resonant circuit;
a resistance of a resistor in the first or second resonant circuit;
an electrical connection between a crystal oscillator and the first or second resonant circuit; and
an electrical connection between a saw-tooth filter and the first or second resonant circuit.

19. The apparatus of claim 11, wherein the first resonant circuit has a different Q factor than the second resonant circuit.

20. The apparatus of claim 11, wherein the at least one first signal comprises a periodic signal with a frequency of at least 100 kilohertz.

* * * * *